(12) United States Patent
Kikinis

(10) Patent No.: US 6,369,792 B1
(45) Date of Patent: *Apr. 9, 2002

(54) LOW POWER HIGH RESOLUTION ELECTROCHEMICAL DISPLAY

(75) Inventor: Dan Kikinis, San Jose, CA (US)

(73) Assignee: Lextron Systems, Inc., Saratoga, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,304

(22) Filed: Sep. 19, 1996

(51) Int. Cl.[7] ................................................ G09G 3/34
(52) U.S. Cl. ...................................... 345/107; 359/290
(58) Field of Search ............................. 345/60, 84, 85, 345/86, 107; 359/290–296

(56) References Cited

U.S. PATENT DOCUMENTS

| | | | | |
|---|---|---|---|---|
| 3,585,381 A | * | 6/1971 | Hodson | 250/47 |
| 3,668,106 A | * | 6/1972 | Ota | 204/299 |
| 3,708,220 A | * | 1/1973 | Meyers et al. | 350/160 R |
| 4,655,897 A | * | 4/1987 | DiSanto et al. | 350/267 |
| 4,732,830 A | * | 3/1988 | DiSanto et al. | 430/20 |
| 4,742,345 A | * | 5/1988 | DiSanto et la. | 340/787 |
| 4,947,159 A | * | 8/1990 | DiSanto et al. | 345/107 |
| 5,007,714 A | * | 4/1991 | Nishimura et al. | 350/353 |
| 5,077,155 A | * | 12/1991 | Simons | 430/7 |
| 5,078,480 A | * | 1/1992 | Warszawski | 359/265 |
| 5,216,416 A | * | 6/1993 | DiSanto et al. | 345/107 |
| 5,223,823 A | * | 6/1993 | DiSanto et al. | 346/107 |
| 5,639,671 A | * | 6/1997 | Bogart et al. | 436/518 |
| 5,739,946 A | * | 4/1998 | Iwanaga et al. | 359/296 |
| 5,745,094 A | * | 4/1998 | Gordon, II et al. | 345/107 |
| 5,898,004 A | * | 4/1999 | Asher et al. | 436/517 |
| 5,930,026 A | * | 7/1999 | Jacobson et al. | 359/296 |
| 6,067,185 A | * | 5/2000 | Albert et al. | 359/296 |
| 6,124,851 A | * | 9/2000 | Jacobson | 345/206 |

* cited by examiner

Primary Examiner—Bipin Shalwala
Assistant Examiner—Vanel Frenel
(74) Attorney, Agent, or Firm—Donald R. Boys; Central Coast Patent Agency, IN

(57) ABSTRACT

A flat-panel display comprises a gelatinous material between two panels having a matrix of pixel electrodes formed between the panels. Suspended ionic particles in the gelatinous material, of a color contrasting to the color of the gelatinous material, are translated in the gelatinous material by activating individual ones of the electrodes, and collecting near the electrodes against one of the panels, form pixels of the color of the particles against a background of the color of the gelatinous material. In preferred embodiments data receiving and control circuitry are provided with the flat panel display for activating electrodes in patterns according to received data, the patterns forming images on a screen. Flat panel displays thus formed require power only when an image on the screen is changed. No power is required to maintain an image once formed. Such a display is especially suitable for forming pages of text for various purposes.

2 Claims, 3 Drawing Sheets

Written State

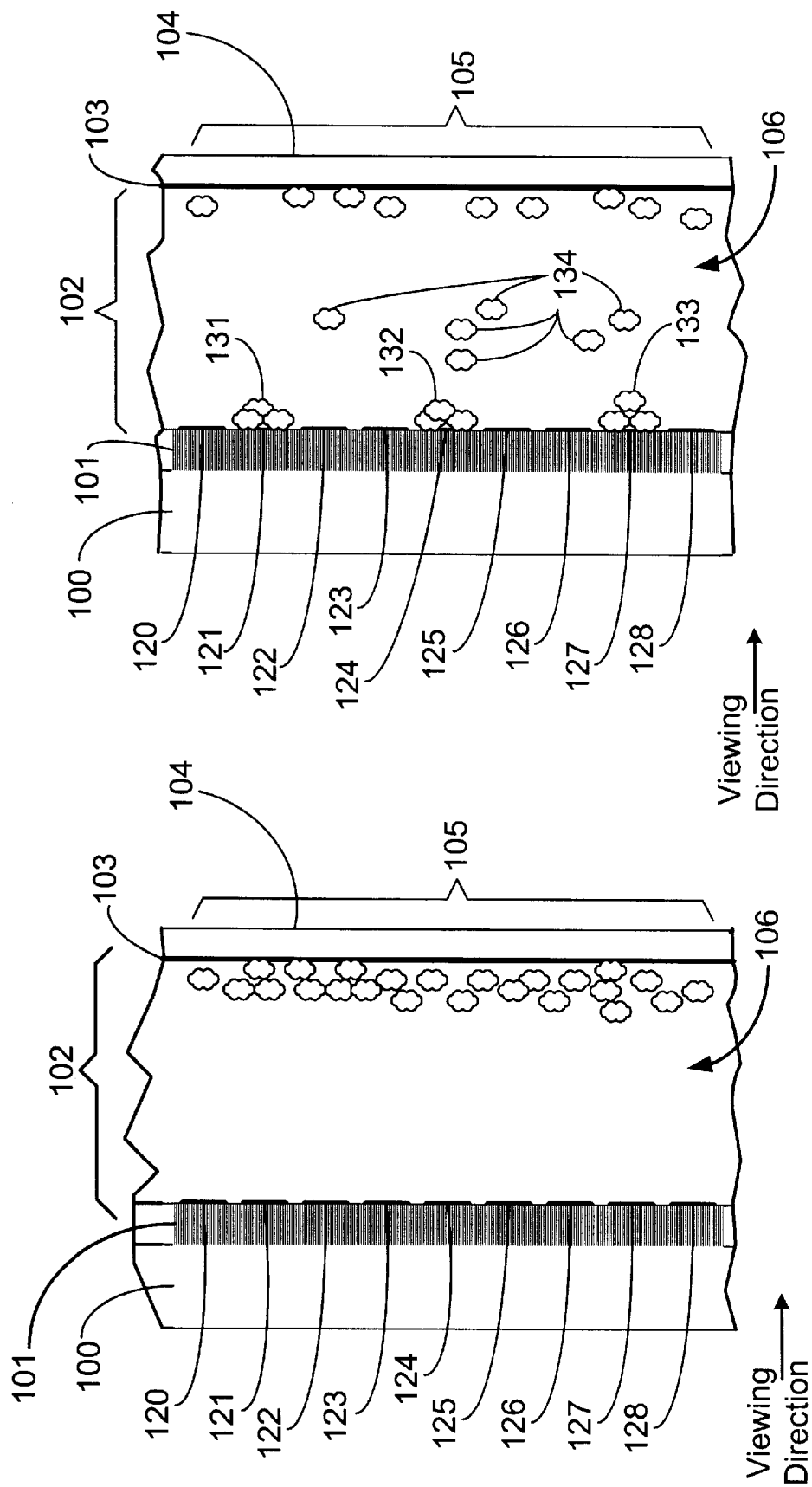
Fig. 2a: Reset (Blank) State
Fig. 2b: Written State

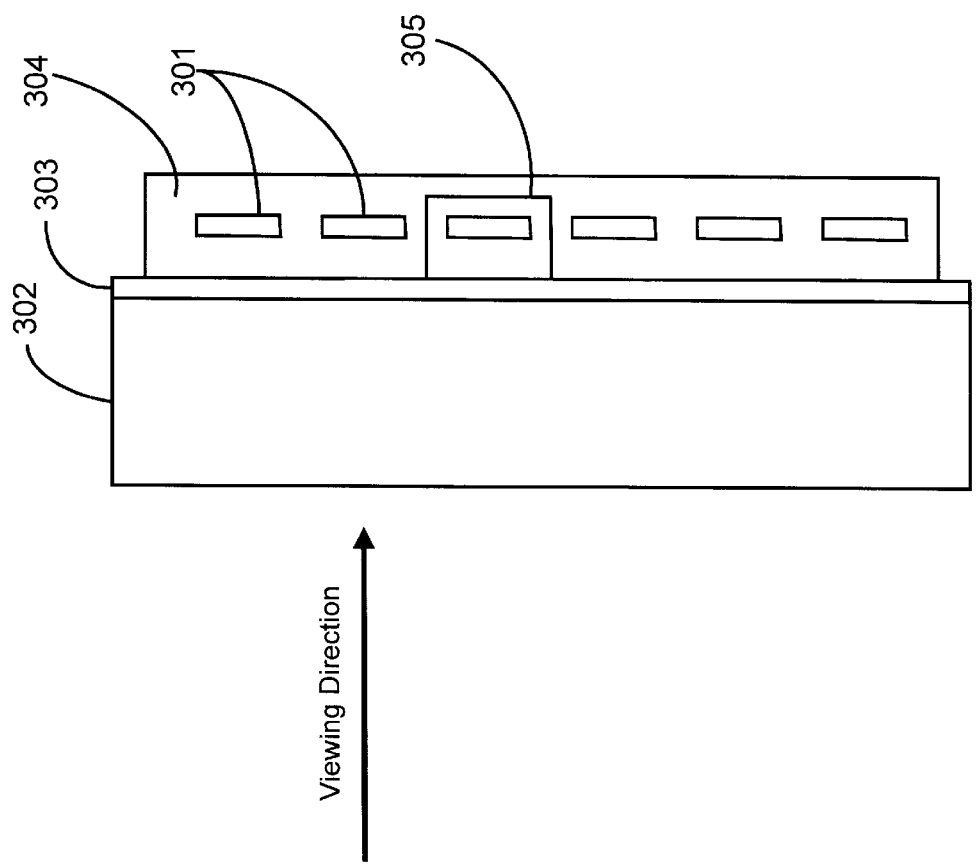
Fig. 3 Single plate electrodes

LOW POWER HIGH RESOLUTION ELECTROCHEMICAL DISPLAY

FIELD OF THE INVENTION

The present invention is in the area of display technology, and pertains in particular to an electrophoretic display with high resolution and low power consumption using electrically-induced motion of charged display markers in a gelatinous base material to present a display.

BACKGROUND OF THE INVENTION

The advent of portable personal computers, such as notebook and laptop computers, required, because of the form factors required, flat panel displays, and several sorts of flat-panel displays have been developed and marketed. Perhaps the two most successful types of such displays are liquid-crystal displays and plasma displays.

Flat-panel displays have been optimized for displaying color and motion, and for operation at low power levels, which is desirable for computers like laptops and notebooks that are, at least part of the time, operated from batteries. In this optimization light weight and resolution have been sacrificed. Flat panel displays optimized in this way typically have resolution of from 50–100 dots per inch (DPI) in each direction. In the case of color displays, because three color dots are needed for each pixel, resolution is even poorer.

There are technologies available which allow resolution as high as 2000 DPI, but the size of such displays is typically limited to fractions of an inch in each direction. Two important reasons for the resolution limits of flat panel displays are power consumption and refresh rate. Given a certain technology, active-matrix LCD for example, power consumption is a function of resolution because each pixel element consumes power. Given a specific screen size, doubling resolution (DPI) quadruples the number of pixels, and therefore quadruples power consumption. Also, increasing the number of pixels increases the amount of data needed to keep the overall display updated.

As an example, a computer display considered to be high resolution might have 1024×768 pixels, each in 3 colors, each addressed by eight bits, and refreshed approximately 70 times per second (70 Hz refresh rate). Such a system requires 165 Mbytes of data per second.

Consider now a small document with printed characters, like a newspaper, with a resolution of about 300 DPI. An 8 inch by 11 inch printed area of such a document represents a resolution of 2400×3300 pixels (monochrome). Data rates in this situation are in excess of 550 Mbytes per second. Also, using any of the popular conventional technologies, such a display would be quite heavy and would consume considerable power.

What is needed is a new display technology, allowing ultra-light (by today's standards), and ultra high-resolution displays, requiring a very low refresh rate and very low power consumption. It is to these ends that the present invention, described in detail below, is directed.

SUMMARY OF THE INVENTION

In a preferred embodiment of the present invention a display panel is provided comprising a first panel; a second panel spaced apart from the first panel, providing a volume therebetween; an open-celled, opaque gelatinous material having a first color in the volume between the panels; multiple ionic particles having a second color suspended in the gelatinous material; and a matrix of electrodes implemented between the two panels or on one of the two panels. Activating individual ones of the electrodes in the matrix causes groups of the multiple ionic particles to translate through the gelatinous material and collect against the first panel, forming a pattern of pixels of the second color against a background of the first color.

In some embodiments the first color is white and the second color is black. In others other colors may be used, with the preference that the colors be easily distinguishable from each other.

The matrix of electrodes in some embodiments comprises individual electrodes spaced in a Cartesian array on one of the two panels and a common electrode surface implemented on the other of the two panels. In these embodiments individual electrodes are formed in or on a polysilicon layer deposited on the one of the two panels, and circuitry for controlling activation of the electrodes is also formed on the one of the two panels. In other embodiments individual electrodes are formed by a first set of substantially parallel lines of transparent, electrically conductive material formed on one of the two panels, and a second set of substantially parallel lines of electrically conductive material at right angles to the first set of substantially parallel lines of transparent, electrically conductive material, the second set of lines separated from the first by means of a semiconducting material. By exceeding the breakdown voltage between those lines, the immediate surroundings become conductive, and individual electrodes are formed at the intersections of individual lines on one panel These areas again act in attracting or repelling suspended ionic particles, resulting in formation of a visible pattern.

In preferred embodiments the display panel comprises a data port and control circuitry connected to the data port, the control circuitry adapted for addressing and activating individual electrodes according to a data stream received at the data port. Methods are provided for forming such displays.

A very big advantage for displays according to embodiments of the present invention is that these displays require power only when altering the displayed image. While a display is maintained, no power is required; that is, the image need not be refreshed. Displays according to embodiments of the present invention are thus especially suited for displaying pages of text, as the mean time between updates for such display can be expected to be. relatively long. Another big advantage, which accrues because of the low-voltage, low-power aspects of the unique technology used for embodiments of this invention, is that resolution may be substantially increased without increasing power requirements. High resolution is also posssible because the structure of devices according to embodiments of the present invention lends itself to small geometry, hence high resolution.

BRIEF DESCRIPTION OF THE DRAWINGS

FIG. 2A is a cross-section view of a portion of the display of FIG. 1 taken along section line 2A—2A of FIG. 1, and shows a blank display condition.

FIG. 2B is the cross-section of FIG. 2A showing an active display condition.

FIG. 3 is a cross-section of a panel in an alternative embodiment of the present invention.

DESCRIPTION OF THE PREFERRED EMBODIMENTS

Figure 1:
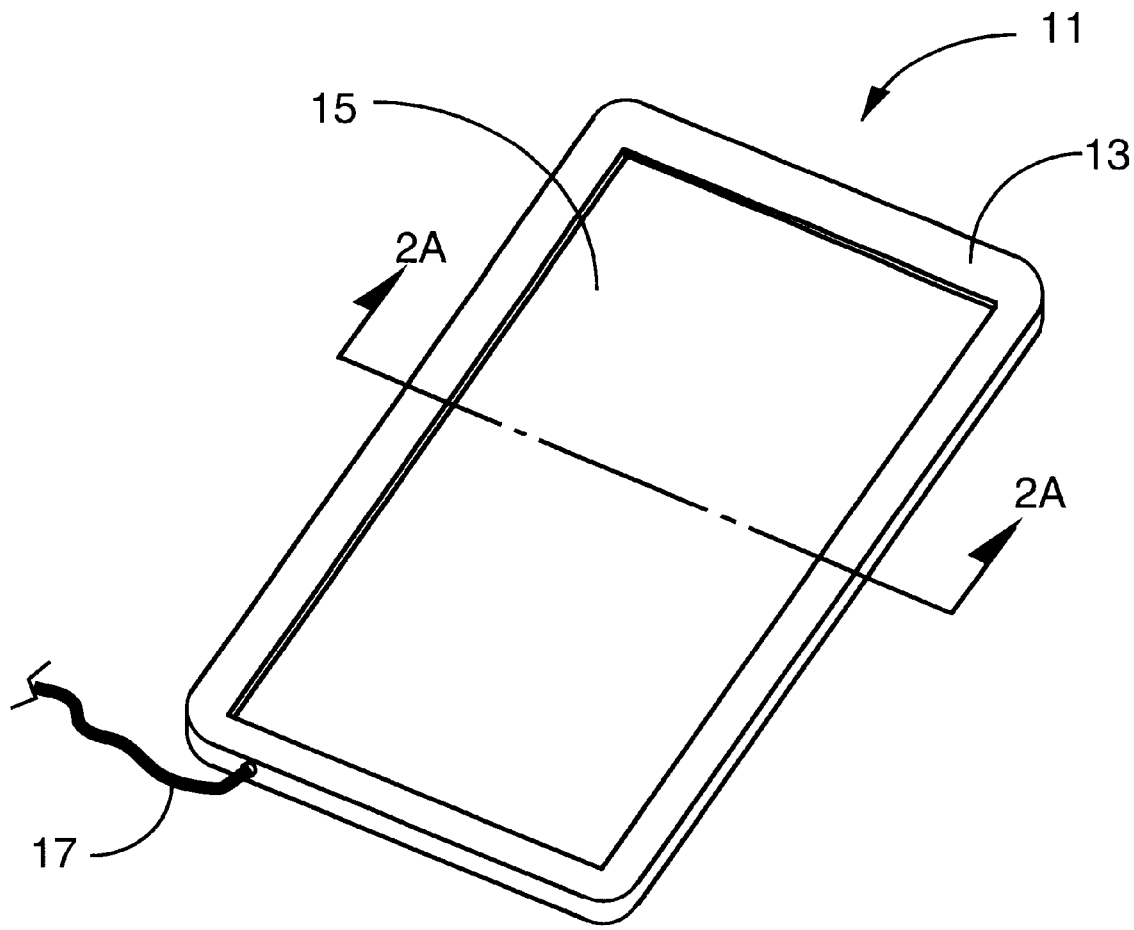
FIG. 1 is an isometric view of a display panel according to the present invention.

In the present invention, as described more fully below, a gelatinous (gel) material is used in combination with charged visual marker particles suspended in the gel material. The gel material is provided between plates wherein one of the plates has a matrix of addressable electrodes and the other may be electrically biased relative to any of the electrodes. In a preferred embodiment the gel is provided in a light color, such as white, and the suspended particles are provided in a dark color, such as black, to provide contrast with the gel.

The charged marker particles suspended in the gel are capable of translating through the gel under the influence of an electrical field, but tend to remain in the last position acquired when the electrical field is removed The gel material for such a display has preferably a long lifetime, is insensitive to electrolysis, and has good optical attributes as well as being opaque as opposed to translucent or transparent. Several gel materials are available having such attributes if properly prepared, such a polyacrylamide gels as used in electrophoresis apparatus. In this case the prepared gel is colored by addition of a coloring agent to be white or another light color. Many benign agents for this purpose are well-known in the arts of paints and pigments and the like. A number of alternatives exist as well for the marker particles suspended in the gel material. One such is the type of material used as toner for laser printers.

FIG. 1 is an isometric view of a display 11 according to an embodiment of the present invention, having a border area 13 and a display screen 15. This particular display is shown with a data input 17 for providing data to display 11 to drive the previously mentioned matrix of electrodes for providing images on display screen 15, but data may be provided in other ways as well, such as by a docking bay with a PC card. The display in many embodiments of the present invention is particularly suited to use for displaying text, and as such is suited as well for system implementation for electronic books and the like.

Displays such as that shown may be implemented in a wide variety of ways. Two such displays, for example, may be attached side by side with a hinge apparatus, so the sides may close against each other like a book. An electronic book may be loaded to such a display combination, and controls (noy shown in FIG. 1) may be provided for functions like turning pages, changing fonts, zooming, and the like.

The matrix of electrodes,.while not shown specifically in FIG. 1, may be implemented in more than one way as known in the art, such as by electrodes fashioned in a transparent polysilicon layer by techniques of semiconductor circuit manufacture, in a similar manner that such electrodes are fashioned for active matrix liquid-crystal (LCD) displays. Alternatively columns of transparent, conductive material, such as titanium nitride, may be formed on one surface and rows of conductive material may be fashioned on an opposite surface (opposite sides of the gel material) such that activating a single row and a single column places a voltage across the gel at a point (one pixel in the display). This is a well-known method used for electroluminescent displays.

FIG. 3 is a cross-section of a portion of one plate of a display according to an alternative embodiment of the present invention wherein a matrix of electrodes is formed by yet another method. In the embodiment of FIG. 3 a glass panel 302 has multiple vertical electrode lines formed thereon, side-by-side and parallel (preferably). Only one such electrode line is seen in FIG. 3 because of the section nature of the figure. A layer of semiconductor material 304 is formed over the vertical electrode lines, and a set of multiple electrode lines 301 are formed in on the semiconductor material, also side-by-side and parallel, and at substantially right angles to the multiple vertical electrode lines 303.

In this electrode scheme, just as in the crossed line embodiment described above, activating any one line in one set with a line in the other creates and electrical field between the lines just at the point that they cross and come in nearest proximity. Since the lines are both in semiconductor material, the electric field at this point bleeds through to the inside surface of the structure (opposite the glass plate) and creates are small charged area on the surface, as illustrated by area 305. In this manner particles embedded in a gel material adjacent to the structure can be attracted to or repelled by pixel areas on the structure.

Regardless of the method for activation, typically in flat-panel displays electronic circuitry for decoding data sent to the display via a data link (17) is contained in the borders (15) of the display panel. This is true as well in preferred embodiments of the present invention.

While FIG. 1 is a preferred form for a display according to the present invention, such displays may take many other external forms, such as physically attached to a body of a portable computer, as is well-known in laptop and notebook computers, or as stand-alone panels to hang on a vertical or semi-vertical surface. It will be apparent to those with skill in the art that there are many alternatives for the physical external form of displays according to embodiments of the present invention, all while staying well within the spirit and scope of the invention.

FIG. 2A is a cross-section of display panel 11 of FIG. 1 taken along section line 2A—2A of FIG. 1, showing the display panel of FIG. 1 in a blanked condition. FIG. 2B is the same section showing the display panel in an active display state. A front glass 100 requires no filters, with the exception of an optional anti-glare filter on the viewing side (not shown in FIG. 2A or 2B). A polysilicon layer 101 in this embodiment comprises driver circuits (not specifically shown) and has a matrix of electrodes such as electrodes 120–128 embedded therein. These electrodes because of the section nature of FIG. 2A and FIG. 2B show a line of nine electrodes of all the pixel electrodes in the display, which number in the tens of thousands. It is understood that there are also electrodes in lines at right angles to those shown, forming an orthogonal matrix of electrodes. The resolution in the direction not shown may the same as that shown or different.

The process to manufacture such polysilicon structures is about the same as used in active-matrix LCD displays, except there is no requirement for a storage capacitor, since after writing the voltage can be removed, as will be further described below.

A back wall 104 of the display is coated with a conductive material that need not be transparent, which coating serves as a common electrode 103 for all the matrix of front electrodes. There are many useful materials for back electrode 103, including a number of metals which may be applied in several different ways to form the electrode surface.

Front glass 100 with polysilicon layer and circuitry 101 is spaced apart from back wall 104 with electrode coating 103 by gap 102. The space between the front and back structures is filled with gel 106. Marker particles 105 are suspended relatively homogeneously in the gel material before the gel is applied.

The width of gap 102 is preferably quite small, such as several microns (shown much exaggerated in the figures), such that the display viewed from the front appears white and solid. In this embodiment particles 105 are preferably black, and exhibit a strong, negative ionic behavior. By applying a positive pulse to back electrode 103 particles 105 are moved through the gel toward the back wall and away from the front wall, becoming sufficiently immersed in the gel to be invisible from the viewing side of the display. This is the condition essentially s shown in FIG. 2A, although it is not really necessary that the particles be all against the back wall as shown, but only sufficiently immersed in the gel that they are not visible from the front.

By now selectively applying a positive voltage to some electrodes, patterns can be written to the panel, and become visible, as the marker particles travel through the gel to those electrodes that are positive (121, 124 and 127 in FIG. 2B) The particles emerge from the gel against the transparent electrodes forming a black pixel at each activated electrode. Electrodes for pixels not intended to be black are held negative to avoid an accidental display in those areas. Clusters of charged particles 131–133 are shown formed just below the positive electrodes, and form now visible black clusters. Some particles in this process of activating the display can also get stranded, such as particles 134, remaining visually buried, since still immersed in the gel.

Very important to the present invention, voltage applied to selected electrodes to form an image can now be removed, and the image formed remains visible. As the invention thus implemented in the embodiment described above provides a monochrome black and white display, and because there are time constraints on moving the charged particles in the gel, the display I this embodiment is particularly suited to text display in pages. For this particular purpose a very short delay in writing a new page is relatively innocuous to a user, and the display draws power only when a new page is written.

To start a new page, a reset cycle is required, pulling all the particles to the back, and then new writing can begin. Writing can of course be done in subsequent phases, creating an illusion of some motion.

Such a display has important use for such as electronic books and teaching aids, and in many other ways as will be clear to those with skill in the art, and it is clear that many of the elements can be replaced or made in a different way, without departing from the spirit and scope of the invention. For example, the charge of the particles can be changed, which would require a reversal of all the voltages described. Also, the gel could be replaced with a sponge or a paper, containing a liquid allowing electrophoresis. The active matrix could be replaced with a cross matrix with a layer providing a tunneling effect, where the breakdown would result in charge applied to the surface, which could slowly trickle it away. While the charge is there, it would attract those particles as well as resulting in a display. There are similarly many other alternatives to the descriptions above, well within the spirit and scope of the invention.

What is claimed is:

1. A display panel comprising:

a first panel;

a second panel spaced apart from the first panel, providing a volume therebetween;

an open-celled, opaque gelatinous material having a first color in the volume between the panels;

multiple ionic particles having a second color suspended in the gelatinous material;

a matrix of electrodes implemented over a surface of at least one of the panels; and a power source providing power to the matrix of electrodes;

wherein activating individual ones of the electrodes in the matrix of electrodes, by applying power from the power source, when a change in the display image is required, causes groups of the multiple ionic particles to translate through the gelatinous material and collect against the first panel, forming a pattern of pixels of the second color against a background of the first color, and wherein, upon deactivating the individual ones of the electrodes, by removing power from the electrodes, the multiple ionic particles, being supported in a constant position by the gelatinous material, maintain the same pattern of pixels against the first panel as when the electrodes were activated, until the electrodes are again activated, by applying power to the electrodes, thereby changing the position of the ionic particles to form a new pattern of pixels, and the pixels remain in position after the power is removed from the electrodes for an indefinite amount of time, thereby minimizing power required.

2. A method for forming an image on a display panel comprising steps of:

(a) forming a matrix of pixel electrodes between two parallel, spaced apart panels;

(b) filling volume between the panels with an open-celled, gelatinous material having a first color;

(c) suspending ionic particles having a second color in the gelatinous material;

(d) activating individual ones of the pixel electrodes by applying power from a power source, causing multiples of the ionic particles to translate through the gelatinous material and to form near the activated electrodes, forming thereby an image; and (e) deactivating the individual ones of the electrodes, by removing power from the display, leaving the multiple ionic particles supported in a constant position by the gelatinous material, for an indefinite period of time, maintaining the same pattern of pixels against the first panel as held when the electrodes were activated, until the electrodes are again activated, by applying power to the display, changing the position of the ionic particles to form a new pattern of pixels, thereby minimizing power required.

* * * * *